Feb. 13, 1968    K. D. S. SEMPER    3,368,803
TRACING MECHANISM FOR OXYGEN JET CUTTING MACHINES
Filed March 9, 1965    3 Sheets-Sheet 1
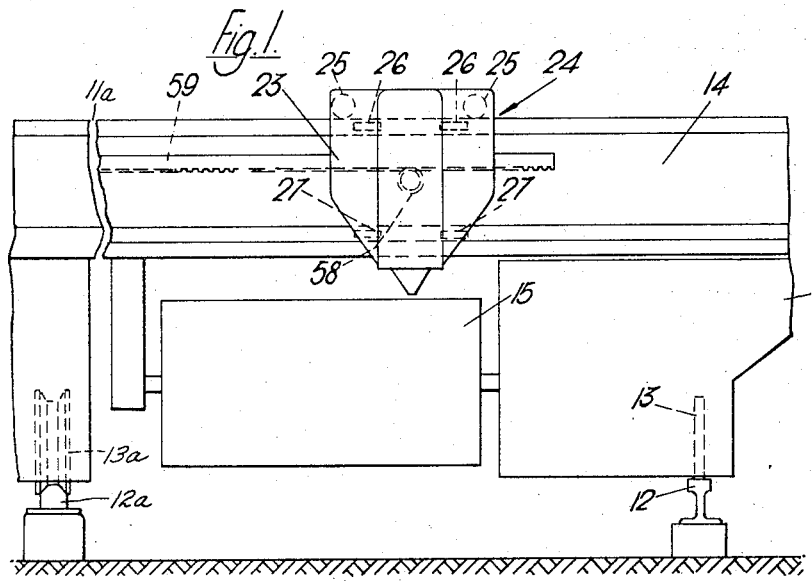
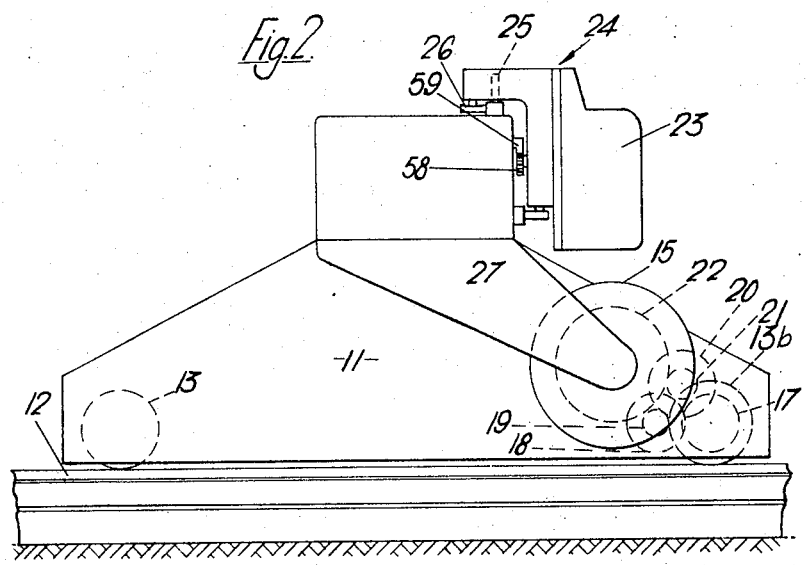
Inventor
KENNETH D. S. SEMPER

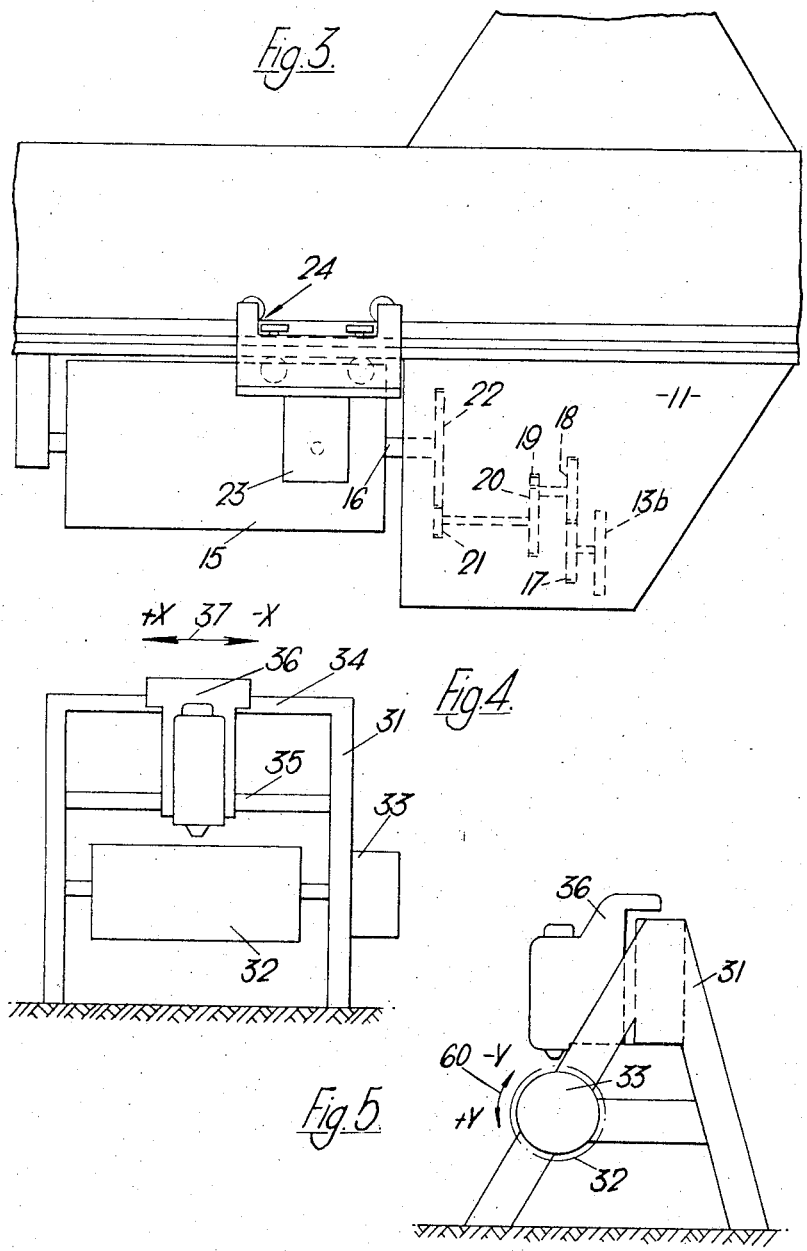

Feb. 13, 1968  K. D. S. SEMPER  3,368,803
TRACING MECHANISM FOR OXYGEN JET CUTTING MACHINES
Filed March 9, 1965  3 Sheets-Sheet 3

Inventor
KENNETH D. S. SEMPER
By *Imirie & Smiley*
Attorneys 3,368,803
TRACING MECHANISM FOR OXYGEN
JET CUTTING MACHINES
Kenneth David Seymour Semper, Croydon, England, assignor to Hancock & Co. (Engineers) Limited, Croydon, England, a British company
Filed Mar. 9, 1965, Ser. No. 438,213
13 Claims. (Cl. 266—23)

ABSTRACT OF THE DISCLOSURE

An oxygen jet cutting installation including an oxygen jet cutting machine for cutting shaped workpieces and a tracing unit having a rotatable drum carrying the outline and an electronic line follower, there being means to provide relative rotational and axial movement between the drum and the line follower in following the outline, and transmission means to cause the relative movements to be multiplied in a desired ratio when being applied to guide the cutting burner.

---

This invention relates to machines for automatically carrying out operations according to an outline which, for example, may be drawn in black ink on white paper. One example of such a machine is an oxygen jet cutting machine and the invention will be described in relation thereto. The invention is particularly suitable for use in the kind of machine which is employed for cutting large plates to a profile or shape defined by the outline.

For cutting metal plates to particular shapes automatic machines are commonly used nowadays, the machines containing an electronic following or tracing head, usually of the photoelectric variety, arranged so that the tracing head automatically follows an outline, which may conveniently be drawn on a sheet of paper, and causes an oxygen jet cutting burner to execute a similar movement over the workpiece, which is the metal plate, and to cut a shape corresponding to the outline from the plate.

For cutting small shapes it is usual to use a drawing on which the outline is drawn full size, and the machine then operates on a 1:1 ratio. Where large workpieces are involved a full size drawing becomes inconvenient and unwieldy and the machines are arranged so that they can operate from a scale drawing in which the outline is, for example, one-tenth full size, and include movement multiplying means so that the oxygen jet cutter moves over an area in which the longitudinal and transverse dimensions are each ten times as large as those on the drawing. The machine then operates on a 10:1 ratio.

While the invention may be employed in the type of machine which operates with a full-size drawing it is especially suited to the type of machine which operates from a reduced scale outline and is commonly referred to as a ratio cutting machine.

Ratio cutting machines of various types are in use, and the invention may be adapted for use with any of these types, but one form of the invention will be described in relation to a machine of the kind disclosed in United States Patent No. 3,301,543 having supporting means upon which a large flat steel plate or workpiece may be laid horizontally, a pair of rails bearing a longitudinal carriage adapted to move over the plate, and a pair of transverse rails mounted on the longitudinal carriage bearing a transverse carriage, the oxygen jet cutting burner being carried on the transverse carriage. Since the longitudinal carriage can move over the machine base along one line and the transverse carriage can move over the longitudinal carriage along a line perpendicular to the said one line, it follows that the transverse carriage, and hence the cutting burner, can move in any direction with respect to the base. It is only necessary to attach to the upper carriage a tracing head with an electronic or photoelectric tracing device adapted to propel itself over the outline while following it, and the cutting burner will automatically cut a shape from the plate or workpiece which corresponds to the outline. For ratio cutting the line follower cannot be directly attached to the upper carriage and speed changing transmission means must be provided between the line follower head and the carriages by which any movement of the line follower is multiplied in the desired ratio before being applied to the upper carriage.

Some types of known ratio cutting machine have a flat drawing table, usually about three feet by four feet in size, upon which the outline is placed, and either the table is mounted on carriages respectively movable in directions which are mutually at right angles so that the table moves beneath the tracer head, or the table is fixed and the tracer head is movable in the two directions over the table. In the moving table type the outline must be movable through its full dimensions in the two directions and the space required for the table, its rails and carriages is about double the table dimensions, that is, about six feet by eight feet. In the fixed table type the space required is at least the dimensions of the table, that is, about three feet by four feet.

One object of the invention is to reduce the amount of space required in an oxygen jet cutting installation for the outline and tracing means.

A further object is to provide an oxygen jet ratio cutting machine with a simpler ratio mechanism than those in common use.

Another object is to provide an oxygen jet cutting machine having a rotatable drum to carry an outline of the shape to which a workpiece is to be cut.

Still a further object is to provide an oxygen jet cutting machine having a rotatable drum to carry an outline of the shape to which a workpiece is to be cut, in which the cutting burner is moved in one direction at a speed related to the peripheral speed of rotation of the drum and is moved in a direction at right angles thereto at a speed related in the said ratio to the speed of relative movement between the drum in the axial direction and an electronic line follower.

Other and further objects of the invention will appear from the subjoined description of selected embodiments of the invention.

The invention broadly consists of a tracing unit for use with an oxygen jet cutting machine, particularly for ratio cutting as herein defined, comprising a rotatable drum adapted to have an outline secured to its periphery, an electronic line follower to follow the outline, transmission means to cause the drum to rotate at a peripheral speed having a predetermined ratio to the speed of movement of the cutting burner over the workpiece in one direction, means to cause relative movement between the drum in the axial direction and the line follower, and transmission means to cause the said relative movement at a speed related in the said ratio to the speed of the cutting burner over the workpiece in a direction at right angles to the said one direction. The rotational movement is also referred to herein as the Y movement.

The relative movement (also referred to herein as the X movement) may be provided by locating the drum endwise and providing means to cause the line follower to move in the longitudinal direction of the drum, or the line follower may be fixed and means may be provided to cause the drum itself to be moved axially with respect to the fixed line follower.

The unit may be made integral with the oxygen jet cutting machine or it may be made as a separate or pilot machine. In the latter case synchro data transmission systems may be used to transmit the information respecting the relative movements between the line follower and the drum surface in the two directions, that is, rotationally and axially of the drum.

Two embodiments of the invention will now be described, by way of example, with reference to the accompanying drawings, in which:

FIGURE 1 is an elevation showing part of the longitudinal and transverse carriages of an oxygen jet cutting machine, with the electronic tracing head and the drum;

FIGURE 2 is an end elevation of the longitudinal carriage of the machine of FIGURE 1;

FIGURE 3 is a plan view of the parts of the machine shown in FIGURES 1 and 2;

FIGURE 4 is a front elevation of a line following unit constructed as a pilot machine separate from the oxygen jet cutting machine, the scanning movements being transmitted to the oxygen jet cutting machine by electrical transmission means;

FIGURE 5 is a side elevation of the machine of FIGURE 4; and

Figure 6:
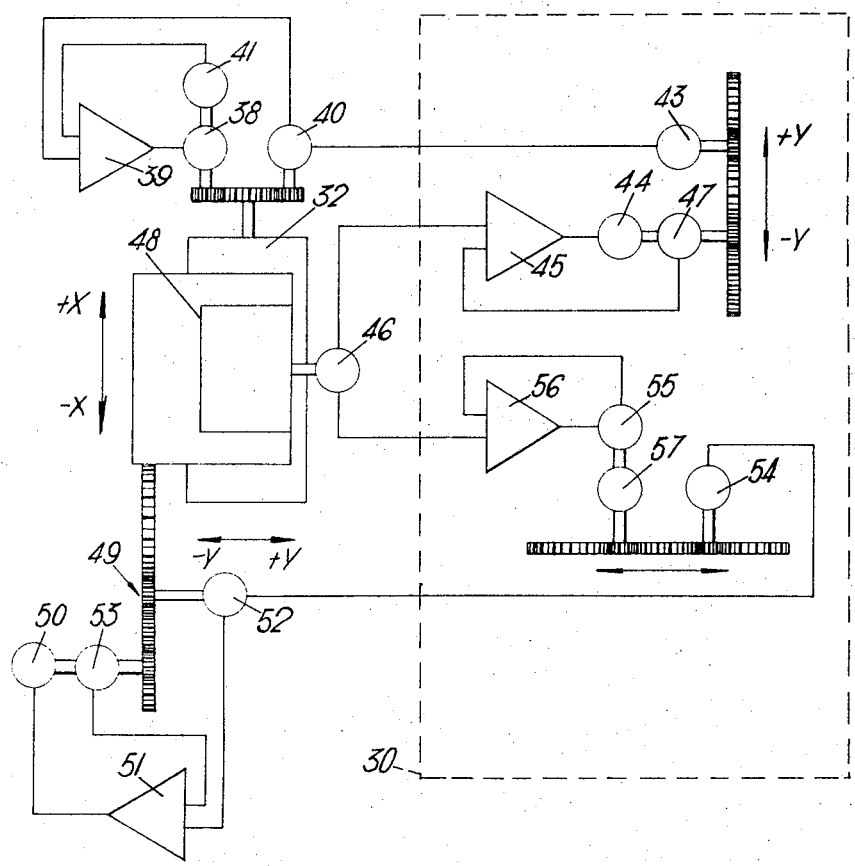
FIGURE 6 is a schematic diagram of the circuitry associated with the pilot machine of FIGURES 4 and 5 and the oxygen jet cutting machine.

Referring to the drawings, FIGURE 1 shows a part of the longitudinal carriage 11 of an oxygen jet cutting machine adapted to run on a pair of longitudinal rails, 12 and 12a. There are four longitudinal carriage wheels and two of them, 13 and 13a, are shown in dotted outline in FIGURE 1, and two of the wheels 13 are shown in dotted outline in FIGURE 2. The two carriage wheels 13a (only one of which is seen) have V grooves and the rail 12a is of inverted V form to ensure that the carriage will always run parallel to the rails 12 and 12a. Part of the carriage structure is omitted between the break lines at 11a since the longitudinal carriage is of considerable width, so that the machine can accommodate very large steel plates for cutting. The longitudinal carriage 11 carries transverse rails (not shown) set at right angles to the rails 12 and a transverse carriage 14 is adapted to run on the transverse rails. The transverse carriage carries the oxygen jet cutting burner, as is usual in machines of this type. Mounted on the longitudinal carriage 11 is a rotatable drum 15 adapted to carry an outline on its periphery. The outline may conveniently be in the form of a sheet of drawing paper upon which the outline is drawn in black ink, and the drawing is stretched around the drum 15. Conveniently the dimensions are such that the major dimension of the drawing is accommodated around the periphery of the drum 15. That is to say, the circumference of the drum must be equal to or larger than the major dimension of the drawing.

Transmission means in the form of gearing is provided between one of the carriage wheels 13b (FIGURES 2 and 3) and a shaft 16 upon which the drum is carried. This may conveniently comprise a first gear 17 made fast on the axle of the wheel 13b, a gear 18 driven by the gear 17 and mounted on a shaft which also carries a gear 19, which in turn meshes with a further gear 20. Mounted on the shaft of the gear 20 and fast therewith is a pinion 21 which drives another gear 22 mounted on the shaft 16 of the drum 15. The ratio of the gearing is such that the peripheral speed of the drum 15 is related in a predetermined ratio to the peripheral speed of the wheel 13b. For example, if the machine is to operate on a 10:1 ratio then the peripheral speed of the drum 15 is one-tenth of that of the peripheral speed of the wheel 13b. Furthermore, the gearing is so arranged that the drum 15 rotates in the opposite direction to the wheel 13b. For example, if on FIGURE 3 the longitudinal carriage 11 were to move upwardly on the rails 12 and 12a (not shown) the wheel 13b would rotate in the clockwise direction when viewed from the right on the drawing, while the drum would rotate in the anti-clockwise direction when viewed from the right on the drawing. This is the Y movement.

A Y motor is provided and is coupled to the wheel 13a or to the gearing 17–22 (if expedient, through reduction gearing) to drive the longitudinal table in either direction and at speeds commanded by signals from an electronic line following device now to be referred to.

Mounted on the upper carriage 14 is a photoelectric tracing head 23 containing the electronic line following device, the head 23 being supported on a movable carriage, generally indicated by reference 24. The tracer carriage 24 runs on suitable bars or rails and is located by three pairs of wheels, respectively 25, 26 and 27. A motor is mounted in the tracer head in accordance with normal practice and is coupled to a pinion 58, which engages a rack 59 on the transverse carriage 14 to move the tracer carriage 24 with respect to the transverse carriage. An X motor is provided to drive the transverse carriage in response to signals from the following device. The motor in the tracing head is also controlled by the X signals from the following device, and the motor speeds and gearing are so arranged that at any instant the tracer carriage moves with respect to the drum 15 in the axial or longitudinal direction thereof at a speed which bears the same relationship to the speed of the transverse carriage as the peripheral speed of the drum bears to the movement of the longitudinal carriage. In the example given this is one-tenth. The transmission is also arranged so that the direction of movement of the tracer carriage 24 with respect to the drum 15 is in the opposite direction to the movement of the transverse carriage with respect to the longitudinal carriage 11. Thus if the transverse carriage is moving to the left in FIGURE 1 the tracer carriage 24 will move to the right along the periphery of the drum 15. This is the X movement. The tracer head is, of course, out of contact with the drum. The longitudinal and transverse carriages may be linked electrically instead of by the mechanical means described.

In an alternative embodiment the tracer carriage 24 may be fixed with respect to the longitudinal carriage 11 while the drum 15 may be arranged to allow axial movement. This could conveniently be achieved by providing the drum with a sliding splined shaft to enable it to move axially while still being coupled for rotation, and mounting the drum bearings on a slide which is movable in the same direction as the transverse carriage, its movement being controlled by a rack on the slide and a pinion engaging the rack and coupled to the said transmission. In this particular instance the axial movement of the drum, the X movement, is in the same speed ratio with respect to the movement of the transverse carriage and in the same direction.

The principal advantage of the arrangement is that it is easier and cheaper to provide supports for the drum shaft than the large flat area, which requires a higher degree of precision in manufacture.

The provision of the drum 15 also quite evidently saves a good deal of space in the machine, particularly as it is possible to mount the drum close to the side of the transverse carriage.

FIGURE 4 shows in diagram form a unit constructed as a pilot machine which is separate from the main oxygen jet cutting machine, but nevertheless controls the latter. It comprises a framework 31 having mounted in it the drum 32, with driving means 33 for the drum, and upper and lower rails, respectively 34 and 35, upon which the line follower or tracing head 36 is carried. Rotation of the drum provides the Y movement. The line follower 36 is adapted to move longitudinally of the rails 34 and 35 to provide the X movement, in the direction of the double-headed arrow 37.

FIGURE 5 is a diagrammatic side elevation of the machine of FIGURE 4 showing the framework 31, the drum 32 and the line follower carriage 36, the Y movement being indicated by the double-headed arrow 60.

One form of control circuitry usable with the pilot machine of FIGURES 4 and 5 is shown in FIGURE 6, in block schematic form. The drum 32 is rotated by a combined motor and tacho-generator unit, the motor portion 38 being fed by the output of an amplifier 39, the input to the amplifier 39 being obtained from a synchro receiver 40. A second input to the amplifier is provided by the tacho-generator portion 41 of the combined unit, the tacho-generator output being applied to the amplifier in opposition to the synchro receiver signal, to provide a stabilizing velocity feedback signal in accordance with conventional servo practice. The synchro receiver obtains its input signals from a synchro transmitter 43, which is driven in synchronism with the Y movement of the cutting machine. The carriage of the cutting machine is driven in the Y direction by a second combined motor and tacho-generator unit of which the motor portion 44 is fed by an amplifier 45 receiving its input from one output of a sine/cosine potentiometer 46. The output of the tacho-generator portion 47 of the second combined unit is fed to the amplifier input in opposition to the signal from the sine/cosine potentiometer to provide the usual velocity feedback signal for stabilizing purposes.

The sine/cosine potentiometer 46 is rotated in one direction or the other by the normal rotational servo mechanism 48 of the line follower head. The line follower head requires no further description at this stage.

The longitudinal movement of the line follower carriage with respect to the drum 32 is provided by a rack and pinion drive, generally indicated by reference 49, the pinion being driven by a third combined motor and tacho-generator unit, of which the motor portion 50 is fed by the output of an amplifier 51 which receives its input from a synchro receiver 52. A velocity feedback signal from the tacho-generator portion 53 of the third combined unit is fed to the input of the amplifier 51 to provide the usual velocity feedback signal.

The synchro receiver 52 is fed with signals by a synchro transmitter 54 which is driven in synchronism with the X movement of the carriage of the oxygen jet cutting machine. This carriage is driven by a fourth combined motor and tacho-generator unit of which the motor portion 55 is fed by an amplifier 56 which receives its input signals from the other output of the sine/cosine potentiometer 46. A velocity feedback signal from the tacho-generator portion 57 of the fourth combined unit is applied to the input of the amplifier 56 in opposition to the signal from the sine/cosine potentiometer to provide the velocity feedback signal.

In operation, the rotational servo of the line follower generates steering signals and through its rotational servo 48 follows the outline which is secured around the drum 32. The rotational servo is mechanically coupled to the sine/cosine potentiometer 46, which provides signals which are applied respectively to the amplifiers 45 and 56 to produce the Y and X movements in the oxygen jet cutting machine. Signals corresponding to these movements are transmitted by the respective synchro transmitters 43 and 54 to the respective receivers 40 and 52, and the output signals from the receivers are transmitted to the respective amplifiers 39 and 51, which produce power signals to drive the respective motors 38 and 50 to rotate the drum and produce the relative axial movement between the drum and the line follower carriage.

It is in many cases convenient to have the line follower section of the installation separate from the cutting machine itself, and if the line follower unit is provided as a separate machine, there is the possibility of using it in conjunction with existing oxygen jet cutting machines by providing appropriate synchro controlled servo drives on the existing machine, so that an existing older type machine may be brought up to date at minimum cost.

To obtain a ratio between pilot and cutting machine, the gearing of the synchros may be changed. Thus, if ten inches of linear travel of each axis of the cutting machine will impart one revolution to the shaft of each transmitter synchro, and one inch of linear travel of each axis of the pilot machine will rotate each shaft of the receiver synchros one revolution, a ratio of 1:10 will be obtained between pilot and cutting machines. By gearing in several receiver synchros and switching from one to another, any one of a number of ratios may be selected at will.

In the embodiment described, the line follower provides steering signals which control the cutting machine, and the cutting machine positions the line follower by the signals transmitted through the synchro links. However, it is quite possible, and within the purview of a person properly skilled in the art, to arrange the pilot machine so that the line follower steers and positions the drum of the pilot machine directly, that is to say, a complete feedback loop is contained in the pilot machine, and the pilot machine is arranged to transmit signals which steer and position the cutting machine.

I claim:

1. In an oxygen jet cutting installation containing an oxygen jet cutting machine having a cutting burner and electronic means for automatically following a closed outline to enable a workpiece to be automatically cut to a shape corresponding to the outline, a tracing unit comprising a rotatable drum adapted to have an outline secured to its periphery, an electronic line follower to follow the outline, transmission means to cause the drum to rotate at a peripheral speed having a predetermined ratio to the speed of movement of the cutting burner over the workpiece in one direction means to cause relative movement between the drum in the axial direction and the line follower, and further transmission means to cause movement of the cutting burner perpendicular to the said one direction at a speed related in the said ratio to the speed of the said relative movement.

2. In an oxygen jet cutting installation containing an oxygen jet cutting machine having a cutting burner and electronic means for automatically following an outline to enable a workpiece to be automatically cut to a shape corresponding to the outline, an electronic line follower to follow the outline, transmission means to cause the drum to rotate at a peripheral speed having a predetermined ratio to the speed of movement of the cutting burner over the workpiece in one direction, the drum being located endwise with respect to the installation, means to cause the line follower to move in the axial direction of the drum in accordance with the direction of the outline, and further transmission means to cause movement of the cutting burner perpendicular to the said one direction at a speed related in the said ratio to the speed of the said relative movement.

3. A unit as claimed in claim 2 which is integral with the oxygen jet cutting machine.

4. A unit as claimed in claim 2 which is integral with the oxygen jet cutting machine, comprising gearing to transmit the relative movements between the line follower and the drum to the oxygen jet cutting machine.

5. A unit as claimed in claim 2 which is integral with the oxygen jet cutting machine, comprising electrical linkage between the two movements of the oxygen jet cutting machine.

6. A unit as claimed in claim 2 which is separate from the oxygen jet cutting machine, comprising means to transmit information respecting the relative movements between the line follower and the drum to the oxygen jet cutting machine.

7. A unit as claimed in claim 2 in which the unit is separate from the oxygen jet cutting machine, comprising synchro elements to transmit information respecting the relative movements between the line follower and the drum to the oxygen jet cutting machine.

8. In an oxygen jet cutting installation containing an oxygen jet cutting machine having a cutting burner and electronic means for automatically following an outline to enable a workpiece to be automatically cut to a shape corresponding to the outline, a tracing unit comprising a rotatable drum adapted to have an outline secured to its periphery, an electronic line follower to follow the outline, transmission means to cause the drum to rotate at a peripheral speed having a predetermined ratio to the speed of movement of a cutting burner over the workpiece in one direction, the line follower being fixed with respect to the installation, means to cause the drum to be moved axially with respect to the line follower in accordance with the direction of the outline, and further transmission means to cause movement of the cutting burner perpendicular to the said one direction at a speed related in the said ratio to the speed of the said relative movement.

9. A unit as claimed in claim 8 which is integral with the oxygen jet cutting machine.

10. A unit as claimed in claim 8 which is integral with the oxygen jet cutting machine, comprising gearing to transmit the relative movements between the line follower and the drum to the oxygen jet cutting machine.

11. A unit as claimed in claim 8 which is integral with the oxygen jet cutting machine, comprising electrical linkage between the two movements of the oxygen jet cutting machine.

12. A unit as claimed in claim 8 which is separate from the oxygen jet cutting machine, comprising means to transmit information respecting the relative movements between the line follower and the drum to the oxygen jet cutting machine.

13. A unit as claimed in claim 8 in which the unit is separate from the oxygen jet cutting machine, and comprising synchro elements to transmit information respecting the relative movements between the line follower and the drum to the oxygen jet cutting machine.

References Cited
UNITED STATES PATENTS

| | | | |
|---|---|---|---|
| 612,978 | 10/1898 | Schrader | 33—22 |
| 2,262,354 | 11/1941 | Cates | 33—23 |
| 2,774,589 | 12/1956 | Bonner | 266—23 |
| 2,933,612 | 4/1960 | Cheverton et al. | 266—23 |
| 3,001,272 | 9/1961 | Picola | 33—22 X |
| 3,037,760 | 6/1962 | Arnault | 266—23 |
| 3,172,938 | 3/1965 | Schwartz | 266—23 |

J. SPENCER OVERHOLSER, *Primary Examiner.*

E. MAR, *Assistant Examiner.*